Dec. 13, 1966 F. HAUSER 3,291,920

RECORDING AND REPRODUCING MACHINE

Filed Jan. 12, 1965 2 Sheets-Sheet 1

INVENTOR.
FRED HAUSER
BY

ATTORNEY.

Dec. 13, 1966 F. HAUSER 3,291,920

RECORDING AND REPRODUCING MACHINE

Filed Jan. 12, 1965 2 Sheets-Sheet 2

INVENTOR.
FRED HAUSER
BY
ATTORNEY.

United States Patent Office 3,291,920
Patented Dec. 13, 1966

3,291,920
RECORDING AND REPRODUCING MACHINE

Fred Hauser, 1544 Midvale Ave., Los Angeles, Calif.

Filed Jan. 12, 1965, Ser. No. 425,034
14 Claims. (Cl. 179—100.2)

This application is a continuation-in-part application of my co-pending application, Serial No. 13,094 filed March 7, 1960, entitled, "Recording and Reproducing Machine," now Patent No. 3,176,083.

This invention relates in general to automatic recording and reproducing machines and more particularly to such machines wherein written intelligence may be recorded upon one side of a recording sheet material while audible intelligence is recorded on or reproduced from an opposite side of the sheet material.

My prior application discloses a recording and reproducing machine adapted to receive a recording sheet material and automatically intermittently advance such material over reciprocating reproducing and recording heads. A writing aperture is provided to allow the machine operator to write directly upon the sheet material upper surface above a recording head, or in the alternative, to read written intelligence on the sheet material as it passes through the machine. The present invention is directed to an improved machine over such prior recording and reproducing machine in which a very much simplified continuous driving means for mounting and carrying the reproducing and recording heads is provided, novel electrical connecting means are disclosed for interconnecting the continuously moving recording and reproducing heads with an electrical-acoustical transducer means, novel indicator means are disclosed to indicate above the top surface of the sheet material the relative positioning of the recording head beneath the material and in which novel transmission means are employed to continuously drive the recording sheet material, the recording heads, the indicator means and portions of the electrical connecting means in continuous uniform relationship.

It is therefore a principal object of the present invention to disclose and provide a recording and reproducing machine including a simple novel continuously moving band means for carrying recording and reproducing heads continuously into and out of recording and reproducing relationship with recording sheet material in association with novel electrical connecting means for interconnecting such continuously moving recording heads with stationary electrical-acoustical transducer means.

It is a further object of the present invention to disclose and provide a novel second continuously moving indicator band means in association with the machine housing and the recording head band means to indicate above the recording sheet material at a location visible to the user a relative location thereon having a predetermined uniform relationship with a recording head moving beneath the recording sheet material.

It is another object of the present invention to disclose and provide a novel transmission means for use in the recording and reproducing machine of the foregoing objects which is adapted to drive the recording sheet material, recording and reproducing heads, portions of the electrical connecting means, and head indicator means passing over upper portions of the sheet material in continuous uniform relationship to each other.

It is another object of the present invention to disclose and provide a recording and reproducing machine in which recording and reproducing heads are continuously moved into and out of recording and reproducing relationship with the underside of recording sheet material passed through the housing, electrically conductive strip means are mounted on and extend continuously around said band means mounting the heads and wherein the conductive means are adapted by commutator means for effecting an electrical connection between said heads and electrical-acoustical transducer means.

The foregoing and additional objects and various advantages of the present invention will become apparent to those skilled in the art from a consideration of the following detailed explanation of an exemplary embodiment of the invention. In such detailed explanation of an exemplary embodiment of the recording and reproducing machine in accordance with the present invention, reference will be made to the appended sheets of drawings in which.

Figures 1, 4, 5, 6, 7:
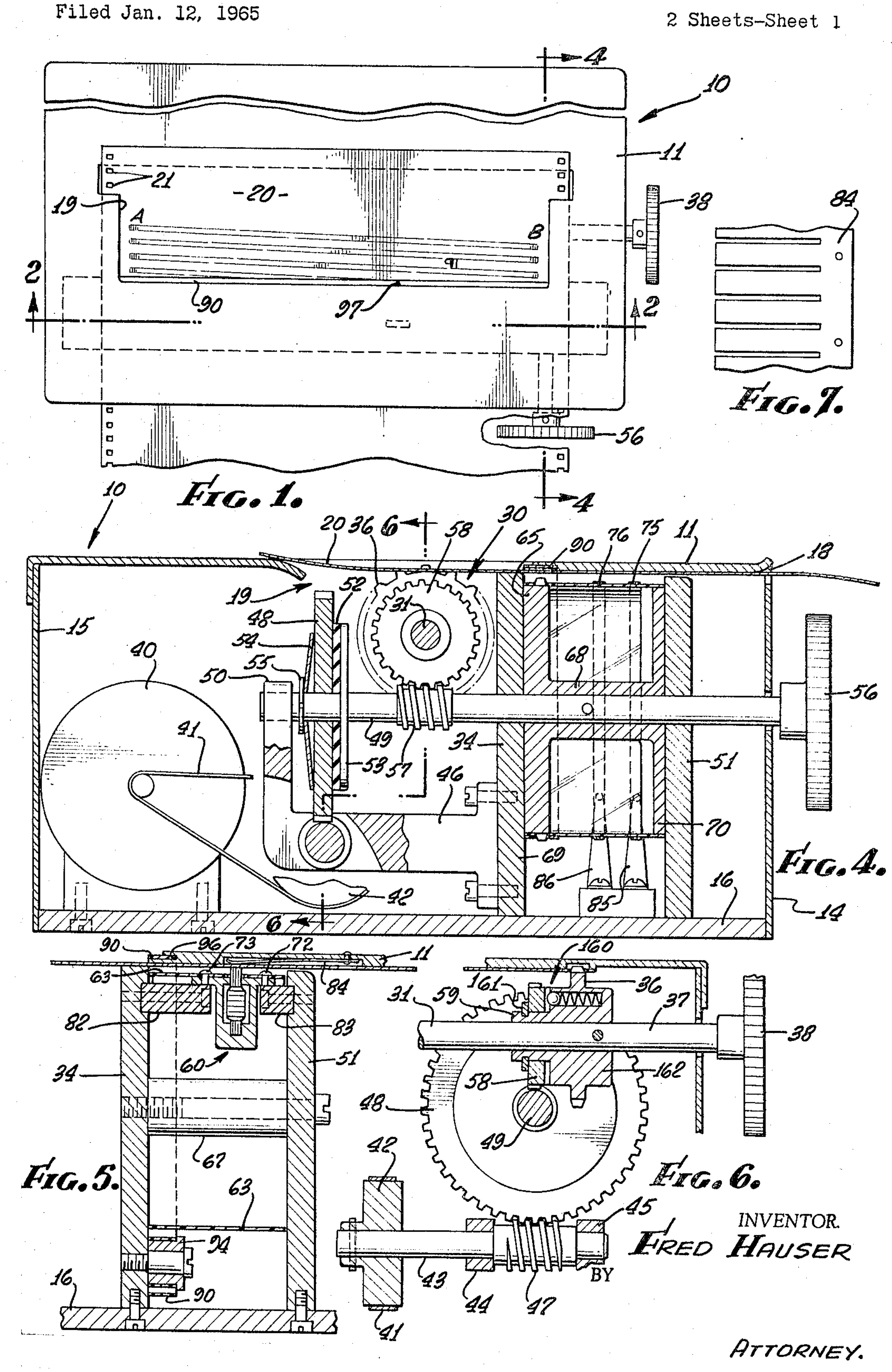
FIG. 1 is a plan view of an exemplary embodiment of a recording and reproducing machine according to the present invention.
FIG. 4 is a vertical section view of the machine of FIG. 1 taken therein along the plane 4—4.
FIG. 5 is a detail sectional view of the machine of FIG. 2 taken therein along the plane 5—5.
FIG. 6 is a detail section view of the machine of FIG. 4 taken therein along the plane 6—6.
FIG. 7 is a detail view of a portion of the machine shown in FIG. 5.

Referring now to FIGS. 1, 2, 3 and 4, the preferred exemplary embodiment of the improved dictating and reproducing machine, in accordance with my present invention, includes a housing, indicated generally at 10. Housing 10 is preferably provided with generally planar top wall 11, opposed side walls 12 and 13, front and rear end walls 14 and 15, and a bottom wall 16. These housing walls may be made of metal, plastic or any other suitable material which is light in weight yet durable and the walls may be assembled into an enclosed housing in any conventional manner, as by screw fastener means 17 in the exemplary embodiment, or by making the housing in a single integral molded plastic member.

Housing 10 is further provided with means for receiving a sheet of recording material into a forward portion thereof and for removing or expelling the recorded sheet material out through an upper portion thereof. In the exemplary embodiment, such means include a flared opening 18 in the forward or front wall 14 which may be of a generally narrow longitudinally extending configuration to receive the sheet of recording material into the housing. A relatively large viewing and sheet material exit opening, indicated generally at 19, may be provided in the top wall 11 of the housing to allow the sheet material to be removed or expelled from the housing by sheet advancing means as subsequently described. The recording sheet material may thereby be readily fed into the housing 10 through the front opening 18 and be fed out or expelled from the top of the housing in a position where it is easily viewed by the operator. This is particularly advantageous since written intelligence will generally be preprinted on the upper surface of the sheet material or, the operator may wish to mark notations on or corrections relative to the recording on the upper surface of the sheet material which is exposed on the upper surface of the housing 10.

Sheet material 20 is preferably made of a plastic or paper material coated with paramagnetic recording material such as iron oxide powder, iron, or an iron alloy. The underside of the sheet material 20, as fed into the housing 10 through flared opening 18, may be fully coated with such paramagnetic recording material to pass over recording and reproducing means within the housing and should include longitudinal marginal portions including perforations 21 to facilitate advancement of the sheet material 20 through the dictating and reproducing machine. The upwardly facing or top side of the sheet material, as it is fed into the recording machine, should preferably be provided with a mat texture to facilitate marking or writing on the material during a recording operation. If the written intelligence is preprinted on the sheet material, any suitable surface for the upper side of the sheet material may be provided whch will receive printing.

Figures 2, 3:
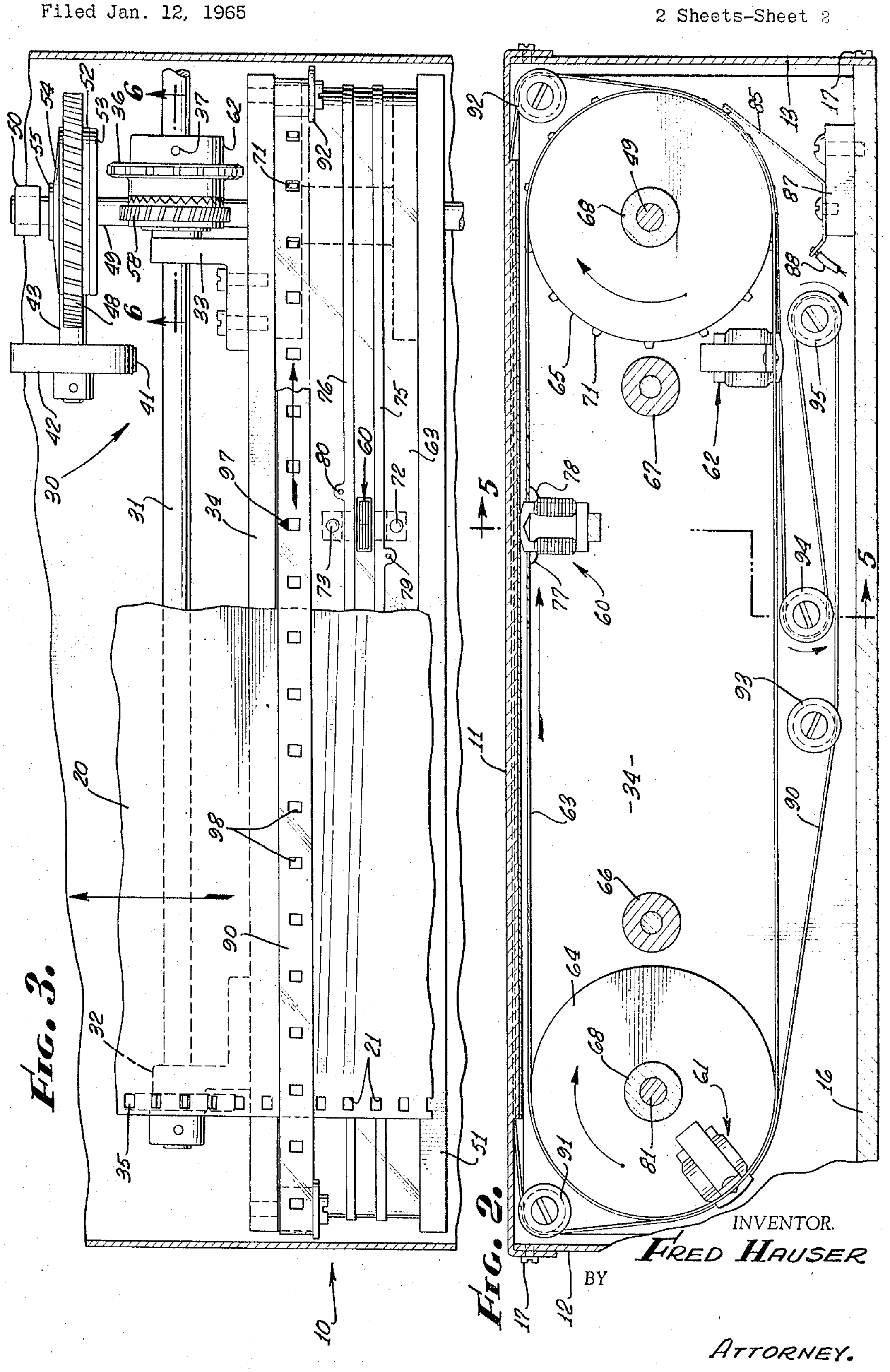
FIG. 2 is a vertical section view of the machine of FIG. 1 taken therein along the plane 2—2.
FIG. 3 is a detail plan view of the machine of FIG. 1 with portions of the housing and sheet material removed.

Means for continuously advancing the sheet material 20 through the housing 10 over the recording and reproducing means are provided within the housing including both automatic and manual advancing means. In the exemplary embodiment, such sheet advancing means is indicated generally at 30, as best seen in FIGS. 3 and 4. Referring first to FIG. 3, a shaft 31 is shown journaled in journal bearings 32 and 33 which in turn are mounted upon a vertical interior housing wall 34. A pair of sprocket wheels 35 and 36 are fixedly mounted upon the shaft 31 and are driven thereby to advance the sheet material 20 through a driving engagement with the perforations 21 in the sheet material. Referring to FIG. 6, it can be seen that the sprocket wheel 36 is non-rotatably mounted on shaft 31 by a pin 37 and may be manually rotated, along with sprocket wheel 35, by the hand-operated wheel or knob 38.

Automatic advancement means for the sheet material advancement means may include an electric motor 40, as seen in FIG. 4, which may be mounted within the housing 10 on the bottom wall 16 as shown. The motor 40 is adapted by a belt 41 to drive a speed reduction pulley 42. As shown in FIGS. 3 and 4, speed reduction pulley 42 is mounted on an axis 43 journaled in a pair of spaced support journal arms 44 and 45, as best shown in FIG. 6, integral with the journal support member 46, as best seen in FIG. 4. A worm 47, as best seen in FIG. 6, is provided on shaft 43 between the journal arms 44 and 45 to engage and drive the large worm gear 48.

A main power shaft 49 is provided within the housing to drive the sheet advancing means, recording and reproducing heads and indicator means as subsequently described. Frictional drive means are provided to interconnect the main drive shaft 49 with the motor drive means 40. In the exemplary embodiment, such friction drive means includes the gear 48 and discs 52 and 53. Worm gear 48 frictionally drives the associated main drive shaft 49, which is rotatably journaled in a journal head portion 50 of journal member 46 and the spaced interior housing walls 34 and 51, and is preferably rotatably mounted upon shaft 49. A disc 52 of a material having a high coefficient of friction is provided on gear 48 to engage the friction disc 53 fixedly mounted upon the shaft 49. Disc 53 is abutted and frictionally driven by the friction drive member 52 under the bias of spring means 54. Spring means 54 are preferably mounted on the shaft 49 and may be properly positioned thereon by a positioning washer 55 to urge or bias the worm gear 48 and its associated friction drive member 52 toward the driven friction disc member 53 mounted on the shaft 49.

From the foregoing, it can be seen that operation of the electric motor 40 causes the friction drive means including the worm gear 48 and its friction drive member 52 to rotate at a reduced speed, compared to that of the drive shaft 43 of the motor, to frictionally drive the shaft 49. This frictional drive can be overcome or overrun by manual operation of the hand wheel or knob 56 secured to an outer end of shaft 49 on the exterior of the housing 10.

Shaft 49 is employed to automatically advance the recording and reproducing mechanism within the housing provided between the spaced interior housing walls 34 and 51, as subsequently described, in unison with continuous advancement of the sheet material 20 through the housing. In order to cause such advancement of the sheet material, a worm 57, as seen in FIG. 4, is provided on the shaft 49 which is adapted to drive a worm gear 58, as also seen in FIG. 6. The worm gear 58 is rotatably mounted on journal portion 59 formed integrally with the sprocket wheel 36.

Worm gear 58 is adapted to drive the sprocket wheel 36 and its associated shaft 31 through an overriding, ratchet-type clutch means including a plurality of spring biased detent means, indicated generally at 160 in FIG. 6. A retaining ring 161 is provided to hold the worm gear 58 in place on its journal member 59 and in abutting relationship with the spring detent means provided within the enlarged central portion 162 of the sprocket means 36. Wheel 58 may be provided with a plurality of circumferentially spaced recesses to receive the spring biased balls as indicated in FIG. 6.

Therefore, operation of the motor 40 to frictionally drive the main drive shaft 49 causes automatic advancement of the sheet material through the rotation of the sprocket wheel 36, its associated shaft 31 and the sprocket wheel 35 mounted at the opposite end of shaft 31. The manually controlled wheel or knob 38 may be employed to selectively advance or retract the sheet material overriding the automatic drive of shaft 49 and gear 58 by means of the ratchet-type clutch connection between the gear 58 and the sprocket 36. In this exemplary embodiment, the sheet material is advanced continuously through the housing by the automatic means except for instances when the manual override controls of knobs 38 and 56 are operated. The number of detent means employed in the ratchet-type clutch indicated generally at 60 should preferably correspond to the number of teeth in the sprocket wheel 36 and be aligned thereto.

A plurality of sound recording and reproducing heads, which may be of conventional construction, are provided within the housing to traverse the under surface of sheet material 20 coated with a paramagnetic recording medium. Referring to FIG. 2, such magnetic sound recording and reproducing heads are indicated generally at 60, 61 and 62. Each of the recording and reproducing heads 60, 61 and 62 is mounted upon and driven by means for moving the recording heads in recording and reproducing relationship with the underside of the magnetic recording sheet material 20 and for electrically connecting each of the recording heads with an electrical transducer system.

In the exemplary embodiment, such recording and reproducing head mounting and driving means includes an endless or continuous band or ribbon 63 as best seen in FIGS. 2 and 3. Endless band or ribbon 63 is mounted upon a pair of spaced band pulleys 64 and 65. These band pulleys are rotatably mounted between the housing interior walls 34 and 51 which are spaced by spacer members 66 and 67 as seen in FIGS. 2 and 5 and are positively driven by main shaft 49 to which the drum 65 is pinned. As best seen in FIG. 4, each of the band or ribbon mounting pulleys 64 and 65 includes a central hub portion 68 and a pair of spaced opposed outer discs portions 69 and 70. The spacing of discs 69 and 70 on each of the pulleys 64 and 65 allows the passage of the recording heads 61, 62 and 63 freely therebetween as the continuous band or ribbon 63 is driven around the pulleys. One of the pulleys, 65 in the exemplary embodiment which is driven by shaft 49, is provided with lugs or sprockets 71 to engage and drive the ribbon or band 63 by a plurality of perforations provided in band 63 along a marginal portion thereof.

Each of the magnetic recording and reproducing heads 60, 61 and 62 are suspended upon the band or ribbon 63, as by the rivets 72 and 73 shown in FIG. 3, or by any other suitable connecting means. Electrical connecting means are provided to interconnect each head with an electrical-acoustical transducer means such as a loud speaker system. Such means may include a pair of continuous electrical conductive strip means provided on the continuous recording head supporting band or ribbon 63 as shown at 75 and 76 in FIG. 3. Each recording head 60, 61 and 62 is electrically connected to the two electrical strip means. As shown in FIGS. 2 and 3, each of the magnetic heads 60, 61 and 62 are provided with electrical connections 77 and 78 connecting the head to the respective electrically conductive strips 75 and 76 at contacts 79 and 80, respectively.

The continuous band or ribbon 63 carrying the magnetic heads is continuously driven by the operation of electric motor 40 and its afore-described frictional drive connection with the shaft 49. The band drum 65 is fixedly mounted on shaft 49 and is rotated thereby to in turn drive the band 63. The other band pulley 64 is rotatably mounted on a stationary shaft 81 mounted between the housing inter-walls 34 and 51. The length of band 63 and the positioning of the three magnetic heads 60, 61 and 62 thereon is determined to bring at least one of the magnetic heads into contact with the underside of the recording sheet material 20 at all times.

As best shown in FIG. 5, a pair of tract-way guides 82 and 83 may be provided on the housing interior walls 34 and 51 to support and guide the magnetic heads, as heads 60 in FIG. 5, between the walls 34 and 51 in magnetic recording relationship with the underside of the recording sheet material 20. In addition, a stationary downwardly biasing sheet positioning comb-like plate 84 as shown in FIGS. 5 and 7 is mounted in the upper wall 11 of housing 10 to bias the recording sheet material 20 downwardly upon the rotating magnetic heads traversing the underside of the recording sheet material.

Commutator means are provided in the exemplary embodiment including a pair of leaf spring arms 85 and 86, as best seen in FIGS. 2 and 4, are provided to engage the continuous electrically conductive strips 75 and 76 respectively. These electrically conductive spring arms may be mounted upon a block 87 of insulation material and be adapted by electrical connections, as the lead line 88, to be connected to a conventional electrical transducer system which is preferably also contained within the housing 10, but not shown in this exemplary embodiment.

Recording and reproducing head position indicator means are provided in accordance with the present invention in order to visually indicate to the operator of the recording and reproducing machine a definite point or loaction above the upper surface of the recording sheet material 20 passing through the housing having a predetermined constant relationship with the positioning of the recording or reproducing head beneath the recording sheet material. The present indicator means may be used in conjunction with recording and reproducing machines having any type of means for moving the recording and reproducing heads. In the exemplary embodiment, such head position indicator means includes a continuous or endless relatively narrow second band or ribbon 90, as best seen in FIGS. 2 and 3. While the first band or ribbon 63 in the exemplary embodiment has a length approximately three times the width of the recording or printing area indicated between A and B in FIG 1, this second band or ribbon 90 is approximately four times the length of the distance AB. It is essential that the second band 90 be longer than the first band 63 in order that it may not only be driven by the aforementioned pulleys 64 and 65 but so that it can extend upwardly over the top of the recording sheet material 10 as hereinafter described.

Referring now to FIG. 2, it can be seen that in the exemplary embodiment, the relatively narrow indicator band 90 is adapted to run endlessly around not only the drums 64 and 65, but also the positioning pulleys 91, 92 and 93, but also around a pair of additional pulleys 94 and 95 adapted to take up the slack in ribbon 90 and allow its greater length to rotate within an area smaller than would otherwise be possible Positioning rollers or pulleys 91 and 92 are adapted to position the head indicator ribbon 90 to pass through a slot 96, as shown in FIG. 5, formed in the upper surface 11 of the housing at the forward edge of the recording sheet exit opening, indicated at 19 in FIG. 4. Slot or guide channel 96 guides the head indicator ribbon 90 over and spaced above the top surface of the recording sheet material 20 riding beneath the housing top wall 11, as best seen in FIG. 5, and is provided with a plurality of indicator arrows 97, as best seen in FIG. 3, to indicate a position above the upper surface of the sheet material 20 aligned to the recording head beneath the sheet material.

In the exemplary embodiment, four pointers 97 are provided on the band or ribbon 90 which is four-thirds as long as the band 63 mounting the three recording heads so that a pointer or arrow 97 is always in alignment with a recording head traversing the sheet recording material. However, the pointer or arrow 97 traverses the sheet material above its upper surface while the recording head is traversing the sheet material below its under surface. Pointer 97 is also rearwardly spaced on the housing at the edge of the opening 19 while the recording head is beneath a portion of the upper wall 11 of the housing.

The plurality of perforations 98 are provided in the head position indicator band 90 to be engaged by the lugs 71 on the band drum 65, drum 65 then driving both the first continuous band means 63 and the second continuous indicator band means 90.

From the foregoing detailed explanation of an exemplary embodiment of the recording and reproducing head in accordance with the present invention, it can be readily seen that recording sheet material with prerecorded audible and written intelligence thereon, or such sheet material ready to receive such intelligence, may be readily fed into the machine and continuously advanced through and out of the machine automatically. The user can manually override the automatic drive to stop, retract or advance the sheet material or recording heads in unison or separately. By observing the movement of the indicator means over the top surface of the sheet material, the user can visually follow preprinted written intelligence thereon corresponding to the reproduction of audible intelligence such as might be done in teaching a foreign language or any teaching aid device. On the other hand, the machine operator may record audible intelligence on the sheet material and, by the novel transmission means, stop the sheet, heads and indicator to mark a written notation or correction on the top of the sheet material in a predetermined location thereon relative to the recording head. Further, the operation and manufacture of the present machine is greatly facilitated and simplified by the provision of the band means for continuously driving the heads and the novel cooperating electrical connection means for electrically connecting each continuously moving head with a stationary transducer means Having then described an exemplary embodiment of my invention, it is to be understood that other embodiments, modifications and adaptations thereof may be made within the scope of the present invention which is defined and limited only by the following claims.

I claim:

1. In a recording and reproducing machine including a housing, a plurality of magnetic sound recording and reproducing heads, motor means and means for receiving and advancing recording sheet material through the housing, said sheet material having a paramagnetic recording material on an underside thereof and an upper surface adapted to receive written intelligence thereon, the provision of:

continuous band means including a pair of axially spaced band drums for mounting and moving said recording and reproducing heads into and out of recording and reproducing relationship with the under surface of said sheet material;

electrical connecting means for interconnecting said heads with a loud speaker system;

indicator means for indicating above the upper surface of said sheet material the relative movement of a head along the sheet material undersurface; and transmission means for drivingly connecting said continuous band means, sheet material advancing means and indicator means with said motor means for uniform relative movement between said heads, indicator means and sheet material.

2. The recording and reproducing machine of claim 1 wherein said indicator means includes:

a second continuous band driven around said band drums and a plurality of additional smaller pulleys;

positioning means including a pair of axially spaced pulleys and guide means formed in an upper portion of the housing to direct said band over the top surface of sheet material advanced through said housing; and a plurality of indicators mounted on said second band to successively ride over said sheet material in spaced alignment with a recording and reproducing head moving beneath the sheet material.

3. The recording and reproducing machine of claim 1 wherein said electrical connecting means comprises:

electrically conductive strip means mounted on and extending continuously around said band means;

commutator means for effecting a sliding electrical contact with said strip means during movement of said band means; and electrical wiring means for connecting said commutator means with said loud speaker system.

4. The recording and reproducing machine of claim 1 wherein said transmission means comprises:

a main power shaft journaled in said housing;

friction drive means interconnecting said shaft with said motor means;

positive drive coupling means coupling said shaft with one of said band drums;

overriding clutch means interconnecting said shaft and said means for advancing recording sheet material through the housing;

manually operable means associated with said main power shaft for controlling movement of said heads, indicator means and sheet material overriding said friction drive means and motor means; and second manually operable means associated with said means for advancing recording sheet material for controlling movement of said sheet material independently of said heads and indicator means overriding said clutch means.

5. In a recording and reproducing machine having a housing containing a plurality of magnetic recording and reproducing heads, means for receiving and advancing a recording sheet material through the housing and a motor drive means, the provision of:

a first continuous band means for mounting and moving said heads into and out of successive recording and reproducing relationship with the underside of a sheet of magnetic recording material received within the housing;

a second continuous band means for mounting and moving indicator means for indicating above the upper surface of said sheet material a point thereon having a predetermined uniform relationship with the position of a head moving below the underside of said sheet material; and drive transmission means for drivingly connecting said first and second continuous band means and said sheet advancing means with said drive means for uniform relative movement.

6. The recording and reproducing machine of claim 5 wherein:

said first continuous band means is provided with three recording and reproducing heads thereon;

said second continuous band means is provided with four indicators thereon; and said second continuous band is one and one-third times as long as said first continuous band means.

7. A recording and reproducing machine having a housing containing a plurality of magnetic recording and reproducing heads, means for receiving and advancing a recording sheet material through the housing and a motor drive means, comprising:

continuous band means for mounting and moving said heads into and out of successive recording and reproducing relationship with the underside of a sheet of magnetic recording material received within the housing;

head position indicator means for indicating an area above the upper surface of the sheet material having a predetermined constant relationship with the position of the head traversing the underside of said sheet material; and drive transmission means for drivingly connecting said continuous band indicator means, and said sheet advancing means with said drive means in uniform relative movement.

8. In a recording and reproducing machine including a housing, a plurality of magnetic sound recording and reproducing heads, motor means and means for receiving and advancing recording sheet material through the housing, said sheet material having a paramagnetic recording material on an underside thereof and an upper surface adapted to receive written intelligence thereon, the provision of:

continuous band means including a pair of axially spaced band drums for mounting and moving said band means;

recording and reproducing heads mounted on said band means, and means for driving said drums to bring said heads into and out of recording and reproducing relationship with the under surface of said sheet material;

electrical connecting means for interconnecting said heads with a loud speaker system;

indicator means for indicating above the upper surface of said sheet material and relative movement of a head along the sheet material undersurface; and transmission means for drivingly connecting said continuous band means, sheet material advancing means and indicator means with said motor means for uniform relative movement between said heads, indicator means and sheet material.

9. In a recording and reproducing machine including a housing, a plurality of magnetic sound recording and reproducing heads, an electrical-acoustical transducer means, a motor drive means and means for receiving and advancing recording sheet material through the housing, the provision of:

continuous band means for mounting and carrying said recording and reproducing heads into and out of recording and reproducing relationship with said recording sheet material;

a plurality of strips of electrically conductive material embedded in said band means;

commutator means mounted within said housing and including a leaf spring contact arm to slidably contact each said strips; and electrical wiring means for interconnecting said commutator means with said electrical-acoustical transducer means.

10. The recording and reproducing machine of claim 9 including transmission means for drivingly connecting said means for advancing sheet material and said band means with said motor drive means for uniform relative movement between said heads and sheet material, and wherein:

said continuous band means includes a pair of axially spaced band drums for carrying and driving said band means, and said transmission means includes a main shaft journaled in said housing and drivingly engaging one of said band drums;

friction drive means for driving said main shaft by said motor drive means;

positive drive coupling means coupling said main shaft with said means for advancing recording sheet material; and manually operable means for manually advancing, stopping or reversing movement of said sheet material and band means overriding said friction drive coupling of said shaft to said motor drive means.

11. In a recording and reproducing machine having a housing including means for receiving and advancing recording sheet material through the housing, a viewing aperture in the housing on a first side of said sheet material and a recording and reproducing head movable within the housing along an underside of said sheet material opposite to said first side, the provision of:

indicator means associated with said housing and aperture for indicating on said first side of said sheet material a relative movement of the recording and reproducing head along said underside of the recording sheet material.

12. In a recording and reproducing machine having at least one recording and reproducing head movable in a predetermined manner beneath a recording sheet material advanced through the machine to record or reproduce audible intelligence thereon, the provision of:

visually observable moving indicator means for indicating a position on the recording sheet material synchronized with the recording and reproducing head whereby written intelligence may be located on said sheet material synchronized to the recording or reproducing of audible intelligence on said sheet material.

13. The provision of claim 12 wherein said visually observable indicator means includes an indicator movable over an upper surface of said sheet material synchronized to movement of a recording and reproducing head moving along an underside of said sheet material.

14. In a recording and reproducing machine having a housing including means for receiving and advancing recording sheet material to the housing beneath a viewing aperture in the housing and above a recording and reproducing head movable within the housing, the provision of:

indicator means for indicating above the upper surface of said sheet material a relative movement of the recording and reproducing head beneath the recording sheet material, said indicator means including:

a continuous band mounted about band drums and a plurality of pulleys mounted within the housing;

positioning means including a pair of axially spaced pulleys and guide means formed in a portion of the housing to direct said band above the top surface of said sheet material advanced through said housing; and an indicator mounted on said continuous band to be carried by said band over said sheet material in spaced alignment with the recording and reproducing head moving beneath the sheet material.

References Cited by the Examiner

UNITED STATES PATENTS

| | | | |
|---|---|---|---|
| 2,245,286 | 6/1941 | Marzocchi | 179—100.2 |
| 2,464,970 | 3/1949 | Finch | 346—139 |
| 2,625,458 | 1/1953 | Ruhland | 346—139 |
| 2,865,637 | 12/1958 | Roberts et al. | 274—4.2 |
| 3,166,752 | 1/1965 | Waterman | 346—74 |
| 3,176,083 | 3/1965 | Hauser | 179—100.2 |

BERNARD KONICK, *Primary Examiner.*

IRVING SRAGOW, *Examiner.*

J. R. GOUDEAU, F. C. WEISS, M. S. GITTES, *Assistant Examiners.*